United States Patent Office 3,059,242
Patented Oct. 23, 1962

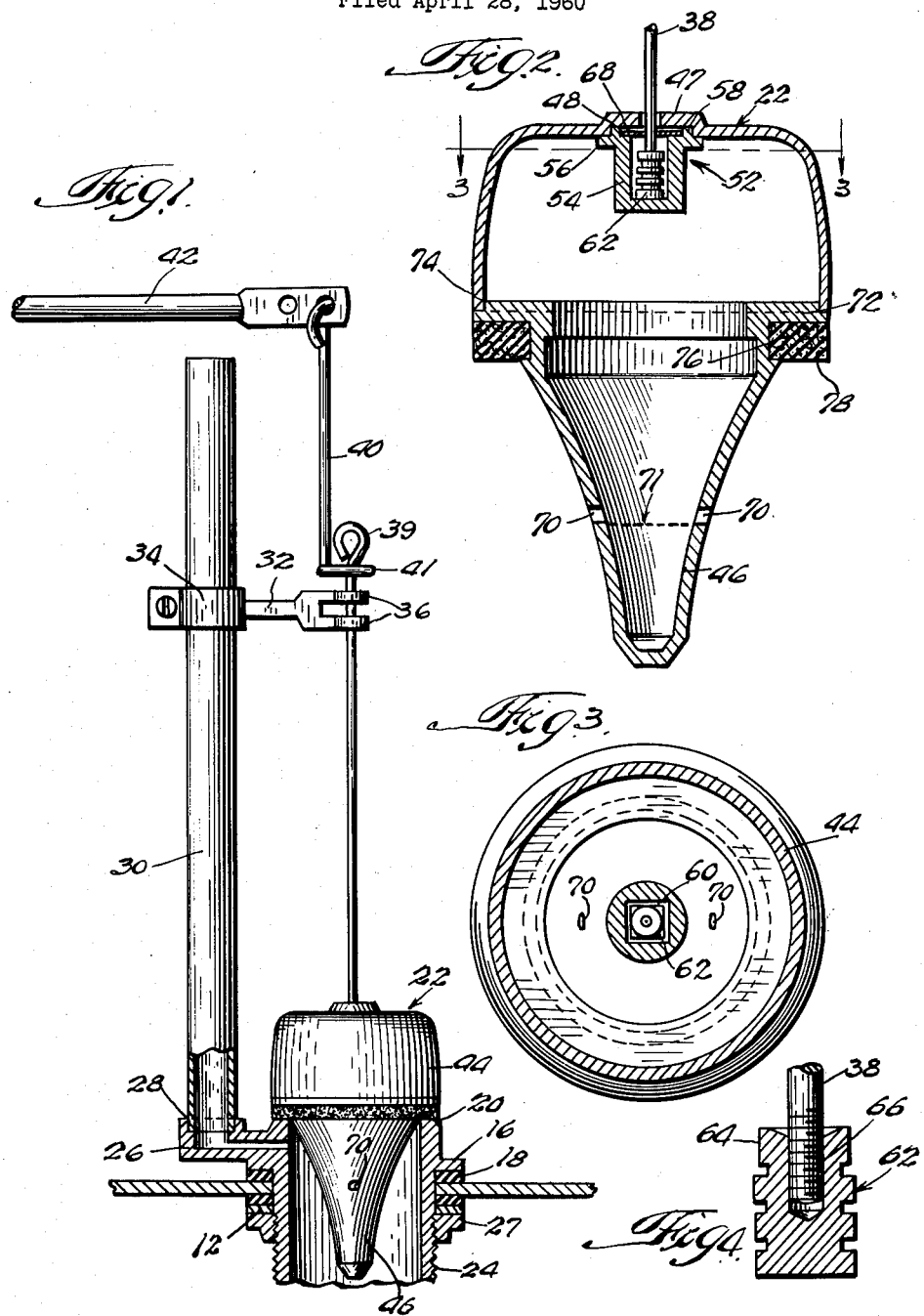

3,059,242
VALVE MEANS FOR TOILET FLUSH TANKS
Herman Bachli, Chicago, and Eugene B. Shapiro, Skokie, Ill., assignors to Chicago Specialty Manufacturing Co., Chicago, Ill., a corporation of Illinois
Filed Apr. 28, 1960, Ser. No. 25,325
2 Claims. (Cl. 4—57)

This invention relates to improvements in valve means for toilet flush tanks.

One of the objects of this invention is to provide an improved valve means for toilet flush tanks which will effectively seat and prevent leakage, yet may be easily raised to facilitate flushing.

Another object of this invention is to provide a flush valve float which is closed at the bottom to form a water trap so that it fills with water to a prescribed level which acts to guide the valve float to proper seating and increases the speed or movement of its descent.

Another object of this invention is to provide a hollow valve float having means permitting it to be occupied with water from the flush tank so that the valve float acts as a plumb for a proper seating of the valve float.

Another object of this invention is to provide a hollow float valve which operates to trap water from the flush tank and to provide the float valve with the required stability to permit it to drop to its valve seating position as quickly as possible after release of the manual valve lifting member so that the float valve will seat properly to form an effective seal against discharge of the water from the tank in a minimum of time, thereby facilitating the refilling of the water tank.

Another object of this invention is to provide improved means for connecting the lifting rod to the flush valve float so that there is sufficient free play in the connection to facilitate proper seating of the valve at all times.

Another object of this invention is to provide a connection wherein the lifting rod is readily attachable to the flush valve to permit ready installation and replacement; also, a construction wherein the connector may be readily secured to the valve body in such a way that the continued lifting and seating operation of the valve will not weaken the connection or impair the efficiency thereof.

Other objects will become apparent as this description progresses.

In the drawings:

FIGURE 1 is a view showing the valve in its environment.

FIGURE 2 is an enlarged sectional view of the valve and its connecting means, and also showing the water level of the water trapped in the valve.

FIGURE 3 is a view taken on lines 3—3 of FIGURE 2, and

FIGURE 4 is an enlarged sectional view of the connector and the lifting rod.

The conventional toilet flush tank 10 is provided with the conventional outlet or drain opening 12 in the bottom of the tank. The conventional fitting 14 extends through the drain opening 12. The fitting 14 is provided with a conventional flange 16 positioned above the bottom of the drain opening 12, which flange rests on a rubber gasket 18. The fitting 14 extends upwardly of the flange 16 and is provided with a valve seat 20 for seating the valve member generally indicated at 22.

The lower end of fitting 14 is externally threaded as at 24 for engagement with a locking nut 27 for securing the fitting to the bottom of the flush tank 10. The fitting is provided with the conventional side connection 26 which has an internally threaded bore 28 for threadedly receiving the conventional overflow pipe or tube 30. For purposes of this structure, the drain opening 12, fitting 14 and drain pipe connected thereto will sometimes hereinafter be referred to as drain outlet or drain pipe.

A guide member generally indicated at 32 has its clamping portion 34 secured to the tube 30. The guide member 32 is provided with spaced members 36 having alined openings to slideably receive the lifting rod 38. The upper end of the lifting rod is looped as at 39 and is secured to a lift wire 40 suspended from a lift lever 42. The lower portion of the lift wire 40 is bent to form a ring 41 to receive the lifting rod 38.

The flush valve float or valve means 22 is best shown in FIGURE 2. The hollow body is preferably made of molded plastic, such as polystyrene, and is formed essentially of two parts. It has an upper shell-like member 44 and a lower stem member 46 secured thereto to form a hollow valve body. The upper end of the shell-like member 44 is raised as at 47 to provide an annular recess 48 therein. The raised portion 47 has a central opening 50.

A connector housing generally indicated at 52 is made of the same material as the valve body. The connector housing has a body portion 54 from which extends an annular flange 56. Extending upwardly of said flange is a circular or ring portion 58 which is adapted to nest within the recess 48 when the connector housing is permanently secured to the member 44. The connector housing has a rectangular shaped bore or interior 60 to loosely accommodate a small connector member generally indicated at 62. The connector is made preferably of metal and has a body of the same cross-sectional shape as the bore 60 but is smaller in dimension so that it fits loosely within the bore 60 to provide a certain free play with respect thereto. The upper end or neck 64 of the connector 62 is circular. The connector 62 is internally threaded as at 66 to threadedly engage the lower threaded end of the lifting rod 38, as best shown in FIGURE 4.

As best seen in FIGURE 2, the connector 62 is placed inside the bore 60 of the connector housing 52 and a metal washer 68 is inserted inside the space bordered by the ring portion 48. The connector housing is then positioned so that the ring portion 58 fits within the recess 48. The connector housing 52 is then permanently bonded to the inside of the shell-like member 44 in any well-known manner. The connector 62 is thus in position for attachment to the lifting rod 38. To connect same the threaded end of the lifting rod 38 is inserted through the opening 50 in member 44 to engage the connector 62 and by rotating the lifting rod with respect to the connector the threaded connection is made.

The connection is such that there is a slight vertical free play and a slight lateral free play between the lift rod 38 and the valve due to the connector 62. It will also be seen that due to the manner in which the connector is supported below the top of the shell-shaped body 44, said connector 62 cannot be pulled up out of the shell or become disengaged from the shell, even with long and hard usage of the valve member.

The hollow stem 46 of the valve member is shaped generally like an inverted cone and is closed at the bottom thereof, as well as throughout, except for two diametrically opposed openings 70 which permit the water from the tank to enter the hollow stem 46.

The portion of the stem 46 from the opening 70 to the bottom of the stem forms a water trap for retaining the water that enters through the openings 70. The water level is indicated by the dotted line 71 in FIGURE 2. This water level is normally maintained throughout the continued operation of the valve and serves a very important function in that the valve member then acts like a plumb and gives the valve member stability and direction to permit it to drop to its proper valve seating where there is uniform contact throughout between the contact area or gasket of the valve, to be described, and the valve seat 20 so that an effective water-tight seal is made at all times. Improper seating of valves, which is common in this art, is thereby eliminated. In addition the trapped water in the valve stem accelerates the rate or speed of descent of the valve after it has been released from its lifted position, thus closing the outlet from the water tank faster than possible with float valves of the prior art.

The upper end of the stem 46 has an enlarged annular flange 72 which forms a shoulder for the rubber gasket. The upper surface of the flange has a stepped edge 74 for engagement with the shell wall of the upper member 44. The shell and stem are permanently bonded together at such juncture. The upper end of the stem has an annular recess 76 adjacent the flange 72 to receive a rubber gasket 78, formed of soft resilient material, which extends under the annular flange 72.

It will be seen that when the valve member is in seated position the gasket 78 rests on the seat 20 of the fitting 14 and provides an effective seal. Also, due to the shape of the stem member a portion of the stem is always confined within the fitting 14, even though the valve is lifted to its most elevated position. The shoulder or flange 72 and the gasket 78 extend over the top of valve seat 20 of fitting 14 and when the gasket 78 engages the seat 20 an effective seal is provided, even if the seat 20 is worn or otherwise defective.

It will be understood that various changes and modifications may be made from the foregoing without departing from the spirit and scope of the appended claims.

What is claimed is:

1. A flush valve float comprising a hollow inseparable body closed at the bottom thereof, said body having a lip adapted to overlie a valve seat, an opening in said body below said lip and above the bottom of the body to permit water to enter so that the water is trapped in the body from the bottom to substantially said opening, said trapped water serving to provide stability and direction for said valve float in its operation so that it seats properly and rapidly, and means at the upper end of said body for attachment to a lifting member for lifting said body as an integral unit.

2. A toilet tank float having a substantially rigid hollow body formed of a shell-like upper portion and a stem of a generally cone shape secured to said upper portion to form an inseparable body, said body having a valve seating portion, said stem being closed at the bottom and provided with an opening above the bottom and below the valve seating portion to permit water to enter the stem and be trapped in said stem between the bottom and substantially said opening, said trapped water causing said tank float to seat properly and rapidly, and means at the upper end of said body for attachment to a lifting member for lifting said body as an integral unit.

References Cited in the file of this patent

UNITED STATES PATENTS

| | | |
|---|---|---|
| 1,018,937 | Snaman | Feb. 27, 1912 |
| 1,593,548 | Delany | July 20, 1926 |
| 1,606,926 | Delany | Nov. 16, 1926 |
| 1,661,112 | Delany | Feb. 28, 1928 |
| 1,712,605 | Delany | May 14, 1929 |
| 2,014,600 | Wayne | Sept. 17, 1935 |
| 2,015,614 | Burnes | Sept. 24, 1935 |

FOREIGN PATENTS

| | | |
|---|---|---|
| 213 | Great Britain | Jan. 17, 1880 |
| 12,432 of 1885 | Great Britain | Oct. 17, 1885 |
| 6,437 of 1895 | Great Britain | Feb. 1, 1896 |